(12) United States Patent
Ichimura

(10) Patent No.: US 7,880,572 B2
(45) Date of Patent: Feb. 1, 2011

(54) LEVER SWITCH

(75) Inventor: Takashi Ichimura, Fukui (JP)

(73) Assignee: Panasonic Corporation, Osaka (JP)

( * ) Notice: Subject to any disclaimer, the term of this patent is extended or adjusted under 35 U.S.C. 154(b) by 245 days.

(21) Appl. No.: 11/972,203

(22) Filed: Jan. 10, 2008

(65) Prior Publication Data

US 2008/0211609 A1 Sep. 4, 2008

(30) Foreign Application Priority Data

Mar. 1, 2007 (JP) .............................. 2007-050988

(51) Int. Cl.
*H01H 9/00* (2006.01)

(52) U.S. Cl. .................. 335/205; 335/206; 335/207

(58) Field of Classification Search ......... 335/205–207; 200/61.27
See application file for complete search history.

(56) References Cited

U.S. PATENT DOCUMENTS

| 2,106,660 A * | 1/1938 | Ross ........................... 340/489 |
| 2,300,571 A * | 11/1942 | Horton et al. ............... 340/476 |
| 2,364,143 A * | 12/1944 | Horton et al. ............. 200/33 R |
| 4,273,971 A * | 6/1981 | Tregurtha ....................... 200/4 |
| 4,788,534 A * | 11/1988 | Engelhardt ................... 340/601 |
| 5,804,784 A * | 9/1998 | Uchiyama et al. ......... 200/61.54 |
| 5,939,961 A * | 8/1999 | Fevre .......................... 335/205 |
| 6,011,225 A * | 1/2000 | Yokoyama ............... 200/61.27 |
| 6,396,011 B1* | 5/2002 | Glowczewski et al. ... 200/61.54 |
| 6,403,899 B1* | 6/2002 | Fitzpatrick et al. ....... 200/61.54 |
| 6,534,733 B2* | 3/2003 | Schwartz et al. ......... 200/61.54 |
| 6,548,775 B1* | 4/2003 | Edwards ................ 200/81.9 M |
| 6,812,435 B2* | 11/2004 | Schilling ................. 219/457.1 |
| 6,864,679 B2* | 3/2005 | Yokoji et al. ............ 324/207.11 |
| 6,873,233 B2* | 3/2005 | Sugiyama et al. ........... 335/205 |
| 2003/0001705 A1* | 1/2003 | Sugiyama et al. ........... 335/205 |
| 2006/0001512 A1* | 1/2006 | Garcia et al. ................. 335/205 |

FOREIGN PATENT DOCUMENTS

JP 2005-129238 5/2005

* cited by examiner

*Primary Examiner*—Elvin G Enad
*Assistant Examiner*—Alexander Talpalatskiy
(74) *Attorney, Agent, or Firm*—Pearne & Gordon LLP

(57) ABSTRACT

First rotator (25) and second rotator (29) rotating according to a rocking operation of outer lever (23) are provided. Magnetism of magnets (26) and (30) mounted on these rotators are detected by magnetic detecting elements (32) and (33) and output as a detected signal. Control portion (34) detects a rotation angle of each rotator from this detected signal and outputs an operation signal corresponding to the detected rotation angle.

3 Claims, 4 Drawing Sheets

LEVER SWITCH

BACKGROUND OF THE INVENTION

1. Field of the Invention

The present invention relates to a lever switch mainly mounted in the vicinity of a steering wheel of a vehicle for use in operating a head lamp, a turn signal lamp, and the like.

2. Background Art

Recently, a lever switch, mounted in the vicinity of a steering wheel of a vehicle and operated for, for example, changing the lighting range of a head lamp and blinking a turn signal lamp, has been increased in number. A technology about such a lever switch is disclosed in, for example, Japanese Patent Application Unexamined Publication No. 2005-129238.

Hereinafter, such a conventional lever switch is described.

FIG. 3 is a sectional view showing a conventional lever switch; and FIG. 4 is an exploded perspective view thereof. In these figures, outer lever 3 and inner lever 4, which are made of insulating resin, are disposed between upper case 1 and lower case 2, which are also made of insulating resin. Furthermore, cover 15 made of insulating resin is disposed so as to cover the lower surface of upper case 1. Outer lever 3 is mounted in inner lever 4 at the left end thereof and protrudes toward the right side at the right end thereof. Furthermore, outer lever 3 is mounted between upper case 1 and lower case 2 in a rockable manner with respect to a middle portion as a fulcrum in the back-and-forth direction and the upper-and-lower direction from a neutral position.

A conventional lever switch is provided with insulating resin pin 5 and coiled spring 6 so that a rocking operation of outer lever 3 and inner lever 4 is carried out with a click feeling. Pin 5 and somewhat bending spring 6 are accommodated in a left end of inner lever 4. Furthermore, pin 5 is brought into elastic contact with a concave and convex portion on the left inner side wall of upper case 1, thereby forming a click feeling means in the back-and-forth direction.

Note here that a click feeling means in the upper-and-lower direction is formed additionally by a cam and an elastic member (not shown), and the like, between outer lever 3 and inner lever 4. Thereby, a rocking operation of outer lever 3 is carried out with a click feeling also in the upper-and-lower direction.

Furthermore, a conventional lever switch further includes operating body 7, driving body 8 and sliding body 9, which are made of insulating resin. The upper end of operating body 7 is engaged with the lower surface of the left end of inner lever 4, and the upper end of driving body 8 is engaged with the side surface of outer lever 3. Furthermore, the upper end of sliding body 9 is engaged with the lower surface of driving body 8.

Furthermore, a conventional lever switch has wiring boards 10 and 11 having a plurality of wiring patterns on the upper and lower surfaces thereof. Wiring board 10 and wiring board 11 are electrically connected to each other with a lead wire (not shown) and the like. Connector 16 is packaged on wiring board 11. In particular, a plurality of fixed contacts 14 are formed on the upper surface of wiring board 10. A conventional lever switch includes movable contacts 12 and 13, made of electrically conductive metal thin plate, corresponding to these fixed contacts 14. One end of movable contact 12 is fitted to the lower surface of operating body 7. One end of movable contact 13 is fitted to the lower surface of sliding body 9. The other ends of somewhat bending movable contacts 12 and 13 are brought into elastic contact with the upper surface of wiring board 10 and fixed contact 14.

Furthermore, a lever (not shown) that is similar to outer lever 3 and inner lever 4 is mounted to the left side of upper case 1 so as to configure a lever switch.

The thus configured lever switch is mounted with outer lever 3 protruding in the lower part of a steering wheel in front of a driver's sheet in a vehicle. Furthermore, a lead wire (not shown) and the like is coupled to connector 16 and a plurality of fixed contacts 14 are electrically connected to an electric circuit (not shown) of a vehicle via the lead wire.

In the above-mentioned configuration, when a rocking operation of outer lever 3 is carried out in the back-and-forth direction, inner lever 4 is rocked with a click feeling by pin 5 and spring 6 in the back-and-forth direction. At the same time, operating body 7 engaged with the lower surface thereof moves in the back-and-forth direction. An end portion of movable contact 12 fitted to operating body 7 elastically slides on the upper surface of wiring board 10. Thus, movable contact 12 is brought into contact with fixed contact 14 corresponding to an operation angle, and electrical connection and disconnection with respect to a plurality of fixed contacts 14 is carried out via movable contact 12.

Then, an electric signal of this is output to the electric circuit of a vehicle. With such a configuration, for example, when a rocking operation of outer lever 3 is carried out in the back-and-forth direction at a predetermined angle, a turn signal lamp for indicating turning right or turning left blinks during the operation. When outer lever 3 is operated at a predetermined angle or more, the turn signal lamp in this direction blinks continuously.

Furthermore, when a rocking operation of outer lever 3 is carried out in the upper-and-lower direction, sliding body 9 moves in the left and right direction via driving body 8 and an end portion of movable contact 13 fitted to sliding body 9 elastically slides on the upper surface of wiring board 10. Thereby, movable contact 13 is brought into contact with fixed contact 14, and electrical connection and disconnection with respect to a plurality of fixed contacts 14 via movable contact 13 is carried out.

Then, an electric signal of this is output to the electric circuit of a vehicle. With such a configuration, for example, according to the direction or angle of the rocking operation, the lighting range of a head lamp is changed to a low position or a high position, or passing, or the like.

That is to say, in the above-mentioned conventional lever switch, when a rocking operation of outer lever 3 is carried out in the back-and-forth direction or the upper-and-lower direction, movable contacts 12 and 13 elastically slide on the upper surface of wiring board 10 and are brought into mechanical contact with fixed contacts 14 according to the operation. Furthermore, movable contacts 12 and 13 are electrically connected to any of the plurality of fixed contacts 14 selectively by the elastic contact force thereof. Then, in accordance with this, an electric circuit of a vehicle blinks a turn signal lamp or changes the lighting range of a head lamp.

Such a lever switch is used in a state in which it is installed in the vicinity of a steering wheel of a vehicle. Such an installation place includes relatively large amount of dust, gas, humidity, and the like, and at the same time, a lubricant and the like is applied to peripheral components.

Therefore, such lubricant, gas, dust, humidity, and the like, enter the inside of the switch and are attached to the contact surfaces of movable contacts 12 and 13 and fixed contacts 14, which may adversely affect electrical connection and disconnection of the contacts. In order to avoid such an inconvenience, in a conventional lever switch, in general, a movable portion of outer lever 3 is covered with a rubber cap, or an adhesive agent and a shielding material is applied to gaps of upper case 1, lower case 2 and cover 15 so as to seal the gaps so that the switch has a hermetically sealed structure.

Thus, in the above-mentioned conventional lever switch, it is necessary that a switch have a hermetically sealed structure for obtaining a stable electrical connection and disconnection between movable contacts 12 and 13 and fixed contacts 14. As a result, the number of components is increased and it takes a long time to construct a switch.

SUMMARY OF THE INVENTION

In order to solve the above-mentioned problems, a lever switch of the present invention includes a rotator rotating according to a rocking operation of a lever; a magnet mounted on the rotator; a magnetic detecting element for detecting magnetism of the magnet and outputting a detected signal; and a control portion coupled to the magnetic detecting element. The control portion detects a rotation angle of the rotator from the detected signal of the magnetic detecting element and outputs an operation signal corresponding to the detected rotation angle. The lever switch of the present invention uses a magnet and a magnetic detecting element, which are not in mechanical contact with each other, instead of a movable contact and a fixed contact. Thus, it is possible to reliably detect a signal corresponding to the lever operation without being affected by lubricant, gas, dust, humidity, and the like, in the periphery. Thus, the number of components is suppressed and the time to construct a switch is reduced.

DETAILED DESCRIPTION OF THE INVENTION

First Embodiment

Hereinafter, the embodiment of the present invention is described with reference to drawings.

Embodiment

Figure 1:
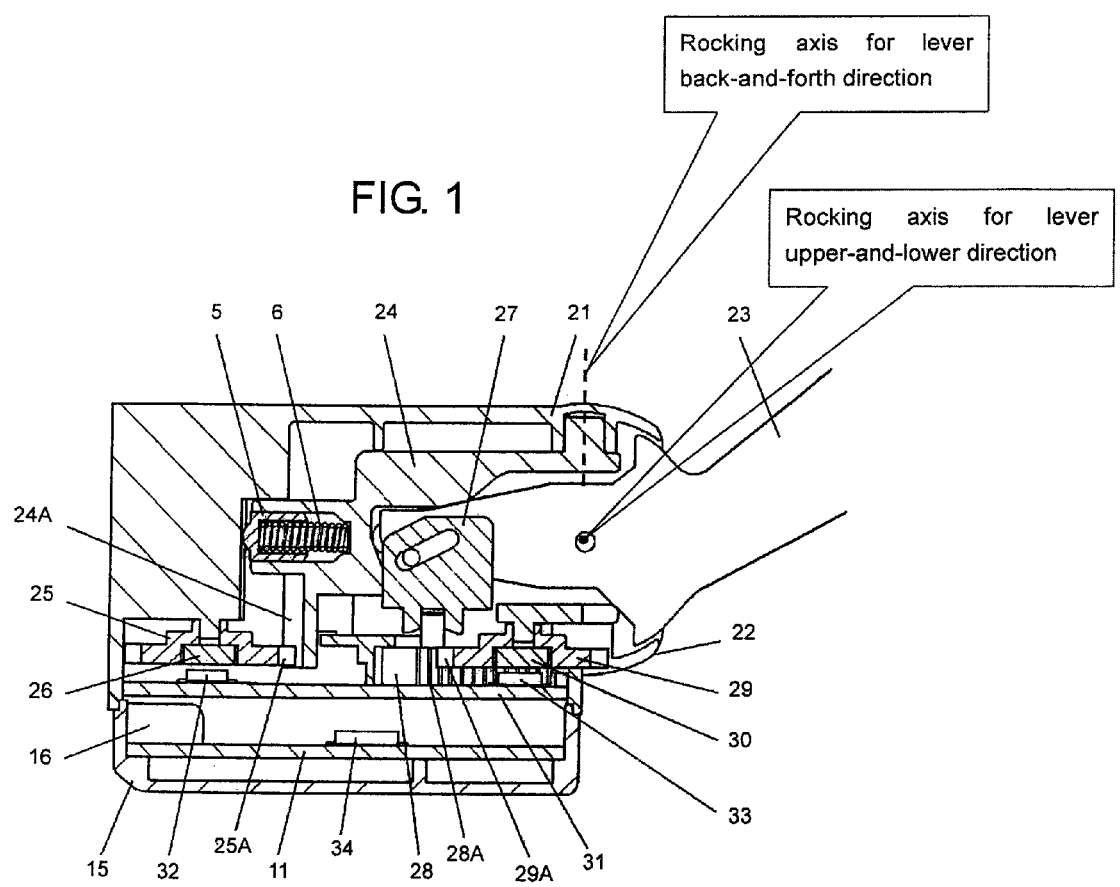
FIG. 1 is a sectional view showing a lever switch in accordance with an embodiment of the present invention.
Figure 2:
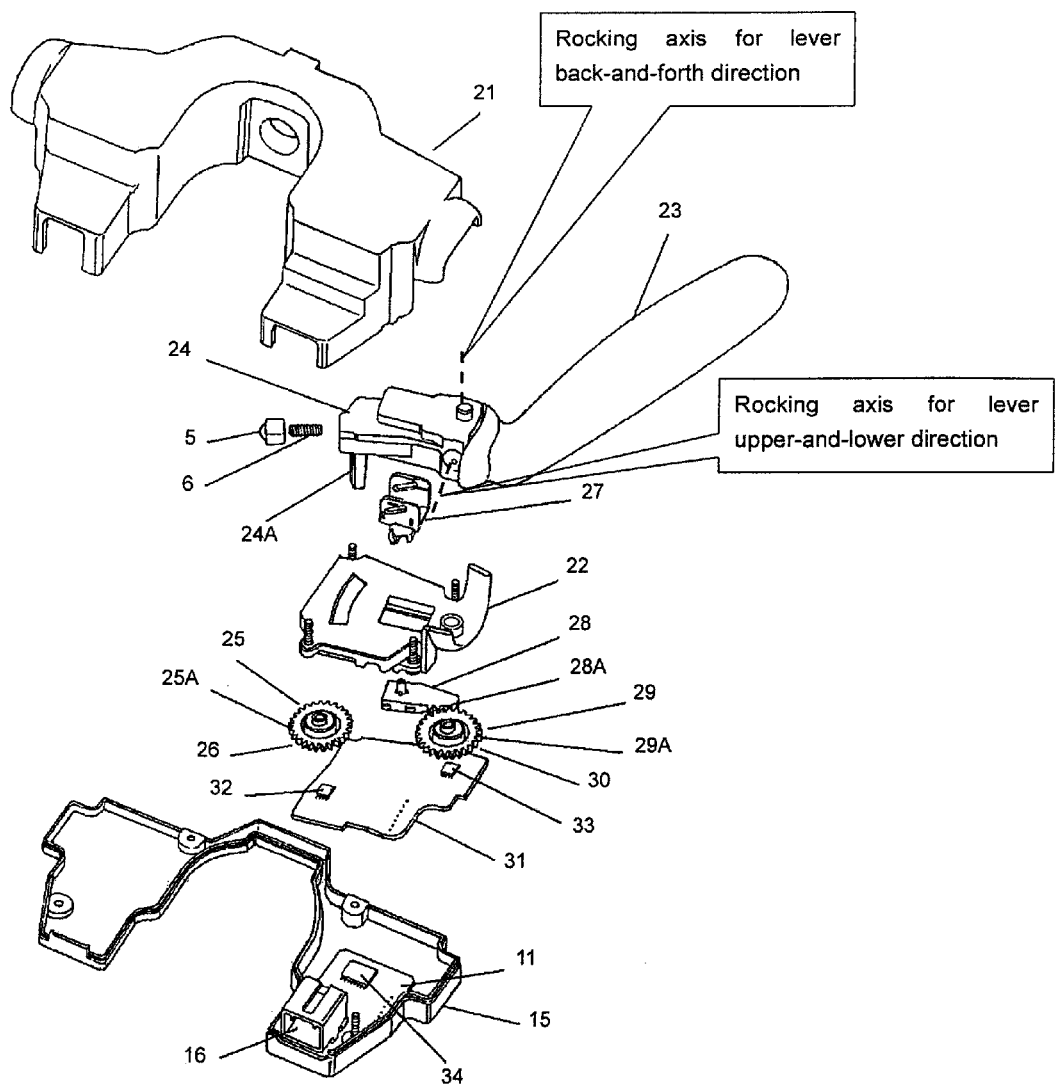
FIG. 2 is an exploded perspective view showing the lever switch of FIG. 1.
Figure 3:
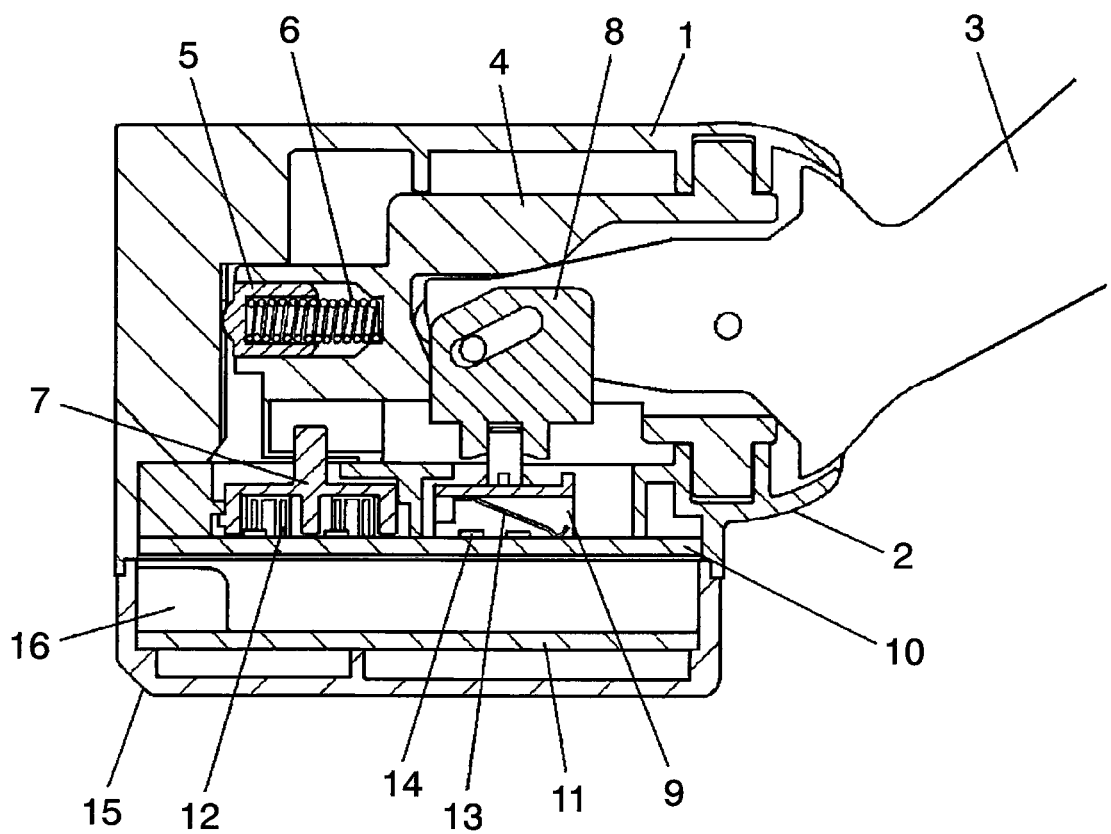
FIG. 3 is a sectional view showing a conventional lever switch.
Figure 4:
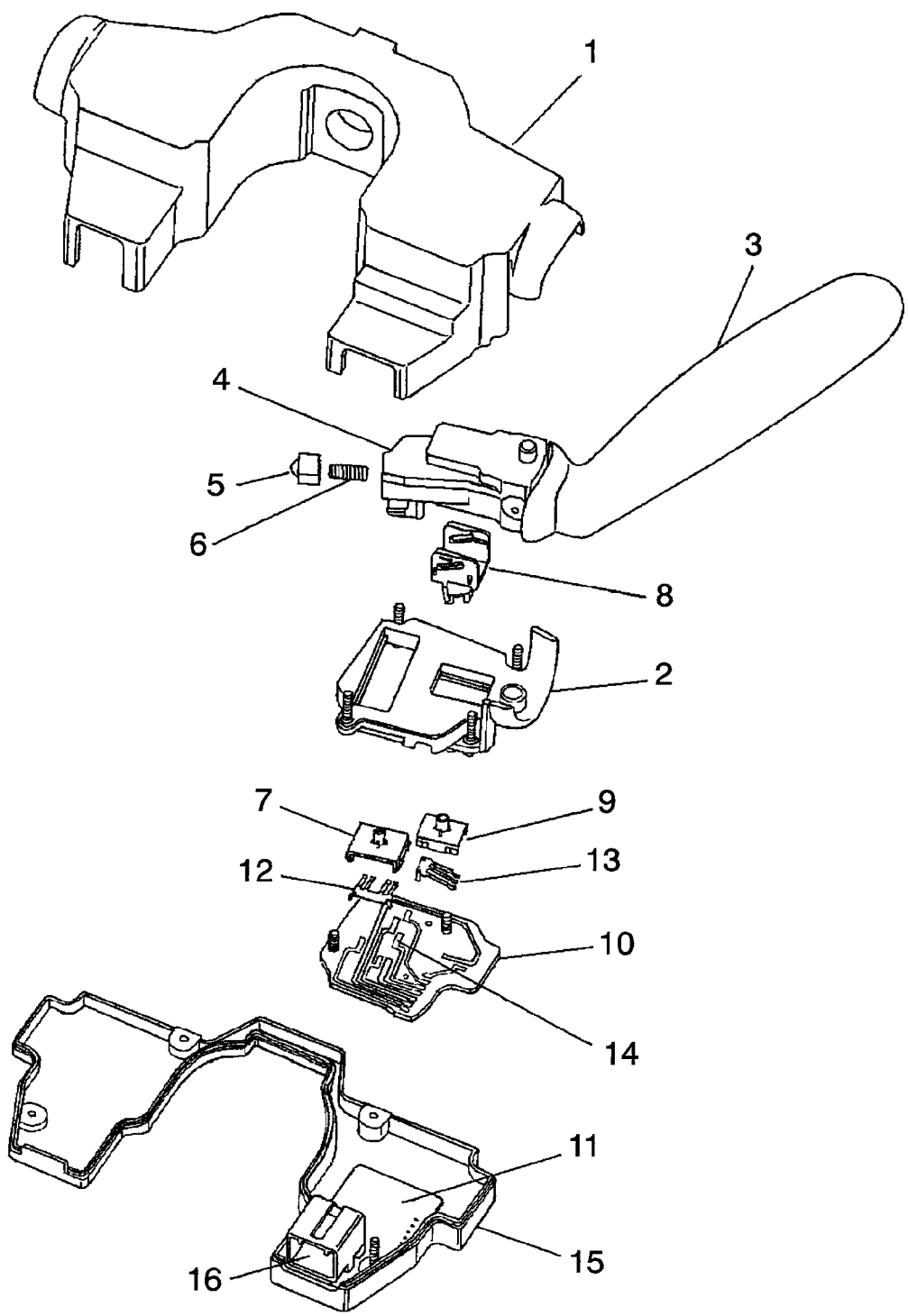
FIG. 4 is an exploded perspective view showing the lever switch of FIG. 3.

FIG. 1 is a sectional view showing a lever switch in accordance with one embodiment of the present invention, and FIG. 2 is an exploded perspective view showing the lever switch.

In this Embodiment, One Example of a Lever Switch Mounted in the vicinity of a steering wheel of a vehicle and operated for, for example, changing the lighting range of a head lamp and blinking a turn signal lamp is described.

As shown in FIGS. 1 and 2, outer lever 23 and inner lever 24, which are made of insulating resin, are disposed between upper case 21 and lower case 22, which are also made of insulating resin. Furthermore, cover 15 made of insulating resin is disposed so as to cover the lower surface of upper case 21. Outer lever 23 is mounted in inner lever 24 at the left end thereof and protrudes toward the right side at the right end thereof. Furthermore, outer lever 23 is mounted between upper case 21 and lower case 22 in a rockable manner with respect to a middle portion as a fulcrum in a predetermined direction, that is, in the back-and-forth direction and the upper-and-lower direction from a neutral position. Thus, this lever switch has a shape in which outer lever 23 protrudes from a lever switch main body into one direction. For example, when a user carries out a rocking operation of a protruding portion of outer lever 23, an operation signal corresponding to the rocking operation is output from this lever switch.

In the description of this embodiment, the direction in which upper case 21 is located with respect to lower case 22 is defined as an upper direction, and the direction opposite to the upper direction is defined as a lower direction; the direction in which inner lever 24 is located with respect to outer lever 23 is defined as a left direction, and the direction opposite to the left direction is defined as a right direction; and the direction perpendicular to the upper and lower directions and the left and right directions is defined as a back-and-forth direction.

Furthermore, this lever switch has insulating resin pin 5 and coiled spring 6 so that a rocking operation of outer lever 23 and inner lever 24 is carried out with a click feeling. Pin 5 and somewhat bending spring 6 are accommodated in a left end of inner lever 24. Furthermore, pin 5 is brought into elastic contact with a concave and convex portion on the left inner side wall of upper case 21, and thereby a click feeling means in the back-and-forth direction is formed.

Note here that a click feeling means in the upper-and-lower direction is formed additionally by a cam and an elastic member (not shown), and the like, between outer lever 23 and inner lever 24. Thereby, a rocking operation of outer lever 23 is carried out with a click feeling also in the upper-and-lower direction.

In addition, this lever switch includes first rotator 25 and second rotator 29 made of insulating resin or metal together with driving body 27 and sliding body 28 made of insulating resin as shown in FIGS. 1 and 2.

The upper end of driving body 27 is engaged with the side surface of outer lever 23 and an upper end of sliding body 28 is engaged with the lower surface of driving body 27.

Furthermore, gear portion 25A formed on the outer circumference of first rotator 25 meshes with gear portion 24A formed on the lower surface of the left end of inner lever 24. Magnet 26 is mounted on the central lower surface of first rotator 25 by insertion molding, and the like. That is to say, a rocking operation of the protrusion of outer lever 23 is carried out in the back-and-forth direction, gear portion 24A of inner lever 24 also moves in the back-and-forth direction, and thereby first rotor 25 meshing with gear portion 24A and magnet 26 mounted thereto are rotated.

On the other hand, gear portion 29A formed on the outer circumference of second rotator 29 meshes with gear portion 28A on the side surface of sliding body 28. Magnet 30 is mounted also on the central lower surface of second rotator 29. That is to say, a rocking operation of the protruding portion of outer lever 23 is carried out in the upper-and-lower direction, sliding body 28 engaged with driving body 27 slides in the left and right direction. Thus, second rotator 29 meshing with gear portion 28A of sliding body 28 and magnet 30 mounted thereto are rotated.

Thus, this lever switch includes first rotator 25 rotating according to an operation in the back-and-forth direction that is one of the directions of outer lever 23, and second rotator 29 rotating according to an operation of outer lever 23 in the upper-and-lower direction as another direction that is perpendicular to the one direction.

Furthermore, this lever switch has wiring boards 31 and 11, made of insulating resin, having a plurality of wiring patterns on the upper and lower surfaces thereof.

Wiring board 31 is disposed substantially in parallel to first rotator 25 and rotator 29. Furthermore, magnetic detecting elements 32 and 33 such as an AMR (anisotropic magnetic resistance) element are mounted on the upper surface of wiring board 31. Magnetic detecting element 32 is disposed on wiring board 31 so that it faces magnet 26, and magnetic detecting element 33 is disposed on wiring board 31 so that it faces magnet 30.

Thus, this lever switch has a configuration in which first rotator 25 and second rotator 29 are disposed facing wiring board 31. In particular, in this lever switch, first rotator 25 and second rotator 29 can be disposed facing in parallel to wiring board 31 by using driving body 27 and sliding body 28, respectively. Therefore, this lever switch can be made thin. At the same time, a complicated mechanical structure is not needed. Thus, the configuration can be simplified.

Furthermore, electronic components such as a microcomputer are packaged on the upper surface of wiring board 11. These electronic components form control portion 34. Furthermore, control portion 34 is electrically connected to magnetic detecting elements 32 and 33 on wiring board 31 by a lead wire (not shown) and the like. In addition, connector 16 coupled to control portion 34 is packaged on wiring board 11.

Furthermore, a lever (not shown) similar to outer lever 23 and inner lever 24 is mounted on the left side of upper case 21, thus forming this lever switch.

The thus configured lever switch is mounted with outer lever 23 protruding in the lower part of a steering wheel in front of a driver's sheet in a vehicle. Furthermore, a lead wire (not shown) and the like is coupled to connector 16 and control portion 34 is electrically connected to an electric circuit (not shown) of a vehicle via this lead wire.

In the above-mentioned configuration, when a rocking operation of outer lever 23 is carried out in the back-and-forth direction, inner lever 24 is rocked in the back-and-forth direction with a click feeling by pin 5 and spring 6. Meanwhile, since gear portion 24A of inner lever 24 meshes with gear portion 25A of first rotator 25, first rotator 25 is rotated and magnet 26 mounted on the center of first rotor 25 is also rotated.

Magnetic detecting element 32 disposed facing magnet 26 detects magnetism changing depending upon the rotation of magnet 26 as a detected signal including voltage waveforms such as a sine wave and a cosine wave. This detected signal is input into control portion 34. Control portion 34 carries out a predetermined calculation of this detected signal, thereby detects a rotation angle of first rotator 25, and outputs an operation signal corresponding to this detected rotation angle to an electric circuit of a vehicle.

The electric circuit of a vehicle detects a rotation angle of first rotator 25, that is, an operation angle of outer lever 23 by this operation signal.

With the lever switch of the configuration as mentioned above, when, for example, a rocking operation of outer lever 23 is carried out in the back-and-forth direction at a predetermined angle, a turn signal lamp for indicating turning right or turning left blinks during the operation. When the operation is carried out at a predetermined angle or more, the turn signal lamp in this direction blinks continuously.

Furthermore, in the above-mentioned configuration, when a rocking operation of outer lever 23 is carried out in the upper-and-lower direction, sliding body 28 moves in the left-and-right direction via driving body 27. Since gear portion 29A of second rotator 29 meshes with gear portion 28A, with the above-mentioned rocking operation, second rotator 29 is rotated and magnet 30 mounted on the center of second rotator 29 is also rotated.

Then, magnetic detecting element 33 disposed facing magnet 30 detects magnetism changing depending upon the rotation of magnet 30 as a detected signal including voltage waveforms such as a sine wave and a cosine wave. This detected signal is also input into control portion 34. Control portion 34 carries out a predetermined calculation of this detected signal, thereby detects a rotation angle of second rotator 29, and outputs an operation signal corresponding to this detected rotation angle to the electric circuit of a vehicle. The electric circuit of a vehicle detects a rotation angle of second rotator 29, that is, an operation angle in the upper-and-lower direction of outer lever 23 by this operation signal. In addition, the electric circuit of a vehicle changes the lighting range of a head lamp to, for example, a low position or a high position, or passing, or the like, based on the operation signal corresponding to the direction and angle in which a rocking operation of outer lever 23 is carried out.

That is to say, in this lever switch, when a rocking operation of outer lever 23 is carried out in the back-and-forth direction or the upper-and-lower direction, thereby first rotator 25 and second rotator 29 are rotated. Control portion 34 detects the rotation angle thereof by magnetic detecting elements 32 and 33 and outputs an operation angle of outer lever 23 as an operation signal to an electric circuit of a vehicle. According to this, the electric circuit of a vehicle carries out blinking of a turn signal lamp and changing of the lighting range of a head lamp, and the like.

As described above, in particular, in the lever switch of this embodiment, detection of the rotation angles of first rotator 25 and second rotator 29, that is, the operation angle of outer lever 23 is carried out by using a magnetism by using, for example, magnetic detecting element 32 facing magnet 26 and magnetic detecting element 33 facing magnet 30. Thus, the lever switch of this embodiment is realized not by a mechanical configuration in which a movable contact that is easily affected by dust, gas, humidity, lubricant, and the like, in the periphery is brought into contact with the fixed contacts but by a so-called non-contact method using magnetism.

Therefore, as mentioned above, even if this lever switch is used in the vicinity of a steering wheel of a vehicle in a state which includes a relatively large amount of dust, gas, humidity, lubricant, it is possible to detect a rotation angle and an operation angle reliably with a simple configuration including magnets 26 and 30, and magnetic detecting elements 32 and 33 without being affected by the peripheral atmosphere.

Thus, according to the lever switch of this embodiment, first rotator 25 and second rotator 29 rotating according to the rocking operation of outer lever 23 are provided, magnetism of magnets 26 and 30 respectively mounted in the central portion of first and second rotators 25 and 29 are detected by magnetic detecting elements 32 and 33 and output as a detected signal. At the same time, control portion 34 detects a rotation angle of each rotator from this detected signal and outputs an operation signal corresponding to the detected rotation angle. Thus, with a simple configuration, it is possible to obtain a lever switch capable of reliably detecting a lever operation without being affected by lubricant, gas, dust, humidity, and the like, in the periphery.

In the above description, a gear portion is provided in each of inner lever 24 and first rotator 25, and each of sliding body 28 and second rotator 29 so that gear portions mesh with each other and are rotated. Instead of the gear portion, when a concave and convex portion capable of transmitting rotation or a high friction portion may be formed respectively, so that rotation is carried out in synchronization with each other. In this case, the present invention can be carried out.

As mentioned above, since a lever switch of the present invention can carry out a reliable detection of a lever operation with a simple configuration, it is effective as a switch for operating a head lamp, a turn signal lamp, and the like, mainly mounted in the vicinity of a steering wheel of a vehicle.

What is claimed is:

1. A lever switch comprising:
   a lever capable of rocking operation in a predetermined direction;
   a first rotator meshing with the lever at a position apart from a rocking fulcrum of the lever and rotating according to a rocking operation of the lever in one direction;
   a second rotator meshing with the lever at a position apart from a rocking fulcrum of the lever and rotating according to a rocking operation of the lever in the other direction perpendicular to the one direction;
   a first magnet mounted on the first rotator and rotating according to the rotation of the first rotator around an axis positioned apart from an axis of the rocking operation of the lever;
   a second magnet mounted on the second rotator and rotating according to the rotation of the second rotator around an axis positioned apart from an axis of the rocking operation of the lever;
   a first magnetic detecting element for detecting magnetism of the first magnet and outputting a first detected signal;
   a second magnetic detecting element for detecting magnetism of the second magnet and outputting a second detected signal; and
   a control portion coupled to the first and second magnetic detecting elements,
   wherein the control portion detects rotation angles of the first and second rotators from the first and second detected signals of the first and second magnetic detecting elements, respectively and outputs operation signals corresponding to the detected rotation angles.

2. The lever switch of claim 1, further comprising a wiring board having the first and second magnetic detecting elements on the surface thereof, wherein the first rotator and the second rotator are disposed facing the wiring board.

3. The lever switch of claim 1, further comprising:
   a first gear portion meshed with the first rotator; and
   a second gear portion meshed with the second rotator,
   wherein the first gear portion changes the rocking operation of the lever in the one direction into the rotation of the first rotator,
   the second gear portion changes the rocking operation of the lever in the other direction into the rotation of the second rotator.

* * * * *